US006451483B1

(12) United States Patent
Probst et al.

(10) Patent No.: US 6,451,483 B1
(45) Date of Patent: Sep. 17, 2002

(54) ENHANCED CAPACITY LI/CF$_x$ ELECTROCHEMICAL CELL

(75) Inventors: Joseph Probst, Williamsville; Esther S. Takeuchi, East Amherst; Sally Ann Smesko, North Tonawanda, all of NY (US)

(73) Assignee: Wilson Greatbatch Ltd., Clarence, NY (US)

( * ) Notice: Subject to any disclaimer, the term of this patent is extended or adjusted under 35 U.S.C. 154(b) by 39 days.

(21) Appl. No.: 09/669,370

(22) Filed: Sep. 26, 2000

Related U.S. Application Data

(60) Provisional application No. 60/156,240, filed on Sep. 27, 1999.

(51) Int. Cl.$^7$ ............................................... H01M 4/58
(52) U.S. Cl. ............................ 429/231.7; 429/231.8; 429/231.95; 429/245; 29/623.1
(58) Field of Search .......................... 429/231.7, 231.8, 429/231.95, 245; 29/623.1

(56) References Cited

U.S. PATENT DOCUMENTS

| 4,548,881 A | 10/1985 | Nalewajek et al. | 429/194 |
|---|---|---|---|
| 4,578,327 A | 3/1986 | Saito et al. | 429/194 |
| 5,716,728 A | 2/1998 | Smesko et al. | 429/60 |
| 5,753,387 A | 5/1998 | Takami et al. | 429/194 |
| 5,888,670 A | 3/1999 | Kawakami | 429/231.4 |

OTHER PUBLICATIONS

Database WPI, Section Ch, Week 197601, Derwent Publications Ltd., London, GB; Class A85 AN 1976–00782X, XP002187369 & JP 50 053829 A (Matsushita Elec Ind Co Ltd), May 13, 1975 (May 13, 1975) –Abstract.*

Database WPI, Section Ch, Week 197726 Derwent Publications Ltd., London, GB; Class L03, AN 1977–46095Y XP002187370 & JP 52 060940 A (Matsushita Elec Ind Co Ltd), May 19, 1977 (May 19, 1977) –Abstract.*

Patent Abstracts of Japan, vol. 014, No. 444 (E–0982), Sep. 21, 1990 (Sep. 21, 1990) & JP 02 177254 A (Matsushita Elec Ind Co Ltd), Jul. 10, 1990 (Jul. 10, 1990) –Abstract.*

Patent Abstracts of Japan, vol. 010, No. 039 (E–381), Feb. 15, 1986 (Feb. 15, 1986) & JP 60 195871 A (Matsushita Denki Sangyo KK), Oct. 4, 1985 (Oct. 4, 1985) –Abstract.*

Database WPI, Section Ch, Week 197909 Derwent Publications Ltd., London, GB; Class A85, AN 1979–16564B XP002187371 & JP 54 007131 A (Matsushita Elec Ind Co Ltd), Jan. 19, 1979 (Jan. 19, 1979) –Abstract.*

Patent Abstracts of Japan, vol. 005, No. 086 (E–060), Jun. 5, 1981 (Jun. 5, 1981) & JP 56 032675 A (Shin Kobe Electric Mach Co Ltd), Apr. 2, 1981 (Apr. 2, 1981) –Abstract.*

* cited by examiner

*Primary Examiner*—Patrick Ryan
*Assistant Examiner*—Angela J. Martin
(74) *Attorney, Agent, or Firm*—Hodgson Russ LLP

(57) ABSTRACT

An alkali metal/solid cathode electrochemical cell, particularly a Li/CF$_x$ cell, having an electrolyte-to-cathode (E/C) weight ratio of about 0.938 to about 0.73, and an anode-to-cathode (A/C) capacity ratio of about 1.03, is described. This provides the cell with an improvement in terms of delivered capacity of about 6% to about 15% under a 1 kohm discharge load, and of about 2% to about 5% under a 2 kohm load in comparison to prior art Li/CF$_x$ cells. Fabricating the cathode electrode at such high pressures was not previously thought possible.

51 Claims, 4 Drawing Sheets

ENHANCED CAPACITY LI/CF$_x$ ELECTROCHEMICAL CELL

CROSS-REFERENCE TO RELATED APPLICATION

The present application claims priority on provisional application Serial No. 60/156,240, filed Sep. 27, 1999.

BACKGROUND OF THE INVENTION

1. Field of the Invention

The present invention generally relates to the conversion of chemical energy to electrical energy and, more particularly, to an alkali metal electrochemical cell having a cathode pellet formed at a higher pressure than dictated by conventional practice while maintaining an acceptable electrolyte-to-cathode (E/C) weight ratio and anode-to-cathode (A/C) capacity ratio. A preferred cathode includes a solid active material and a most preferred cathode active material is a carbonaceous material, such as fluorinated carbon.

2. Prior Art

A prior art Li/fluorinated carbon cell, particularly a Li/CF$_x$ cell constructed according to U.S. Pat. No. 5,716,728 to Smesko et al., which is assigned to the assignee of the present invention and incorporated herein by reference, is typically housed in a conductive casing having nominal dimensions of 45 mm×23 mm×5 mm (referred to as a 5 mm Li/CF$_x$ cell). This Li/CF$_x$ cell is known to have an electrolyte-to-cathode (E/C) weight ratio of about 0.94 to 0.96 and an anode-to-cathode (A/C) capacity ratio of about 1.03. Both the E/C weight ratio and the A/C capacity ratio are based on the gram amount of electrode active material. In other words, the Smesko et al. cell has about 3% excess lithium (in terms of deliverable capacity).

A Li/CF$_x$ cell built according to Smesko et al. has a volumetric energy density of about 1,066 Wh/L, a gravimetric energy density of about 519 Wh/kg, an open circuit voltage of 3.0 to 3.3 volts and an estimated self-discharge rate of less than 1% per year. The cell will not rupture or leak when subjected to short circuit conditions at room temperature or at 37° C. The volumetric and the gravimetric energy densities are based on the internal volume and total weight of the active components, respectively.

Interestingly, the Smesko et al. cell is itself an improvement on the Li/CF$_x$ cell described in U.S. Pat. No. 5,250,373 to Muffoletto et al., which is assigned to the assignee of the present invention and incorporated herein by reference. The Muffoletto et al. cell has a E/C weight ratio of 1.32 based on the gram amount of cathode active material. In the Muffoletto et al. cell, the presence of increased amounts of electrolyte with respect to the gram amount of cathode active material was thought necessary to maintain the internal impedance of the cell low, especially as end-of-life neared. The Smesko et al. cell showed for the first time that excess amounts of electrolyte are not necessary in order to maintain efficient discharge throughout the life of a Li/CF$_x$ cell.

In an application where a premium is placed on increased energy density, such as in power sources associated with implantable medical devices, there is a need for an alkali metal/fluorinated carbon electrochemical cell which provides improved volumetric energy density and increased discharge efficiency over those of the prior art, including the Smesko et al. and Muffoletto et al. cells. The cell of the present invention fulfills this need by having a comparable anode-to-cathode capacity ratio but a reduced electrolyte-to-cathode weight ratio that optimizes the electrochemical reactions at the electrodes. This is brought about by pressing the cathode at a higher pressure than is currently practiced in the prior art cell of the Smesko et al. patent.

SUMMARY OF THE INVENTION

According to the present invention, the pressed density at which carbon monofluoride cathodes are formed is used to control the shape of the discharge profile and, thereby, enhance the cell's delivered capacity, especially when such material is used in implantable medical applications. As a majority of implantable medical devices operate above a 2.0 V cutoff, improved delivered capacity enhances device performance and increases device longevity. Increased delivered capacity is realized by using a cathode electrode having the same chemical composition, formulation, and weight as in the state-of-the-art or prior art cells, but pressed at a higher pressure. Increasing the compaction of the cathode mixture increases the electrode's pressed density. Using the same cathode active material weight, anode active material weight and electrolyte weight as in the Smesko et al. cell, the cell of the present invention delivers about 6% to about 15% additional capacity when the cathode is fabricated having an increased pressed density and the resultant cell is discharged under a 1 kohm load. When discharged under a 2 kohm load, about an additional 2% to about 5% delivered capacity is realized.

Accordingly, increasing the pressed density of the cathode is used to add additional cathode active material to the cell (increase the cathode's active weight). This results in an increased theoretical volumetric energy density for a cathode-limited cell. The anode/cathode capacity ratio of the cell is also maintained by increasing the amount of anode active material used. This is important in implantable device power sources because the cell voltage gradually falls as end-of-service is approached. Increasing the cathode press density allows the volume available for the anode active material to be expanded or increased, thus allowing the A/C capacity ratio to be maintained without detracting from the end-of service signature of the cell chemistry.

Conventional reasoning would hold that if all of the inactive cell components of a particular cell design are left unchanged, an increased cathode press density would dictate that the electrolyte-to-cathode weight ratio may actually not be able to be maintained because of the additional cathode and anode active materials.

Therefore, conventional reasoning says that the E/C weight ratio would decrease resulting in reduced cell performance under certain high rate applications. However, in the present Li/CF$_x$ system, this does not occur. Carbon monofluoride cathodes of a higher pressed density according to the present invention have been found to absorb less electrolyte but are still able to utilize what electrolyte there is efficiently enough to maintain ion mobility during cell discharge.

These and other objects of the present invention will become increasingly more apparent to those skilled in the art by reference to the following description and to the appended drawings.

DETAILED DESCRIPTION OF THE PREFERRED EMBODIMENTS

Figure 1:
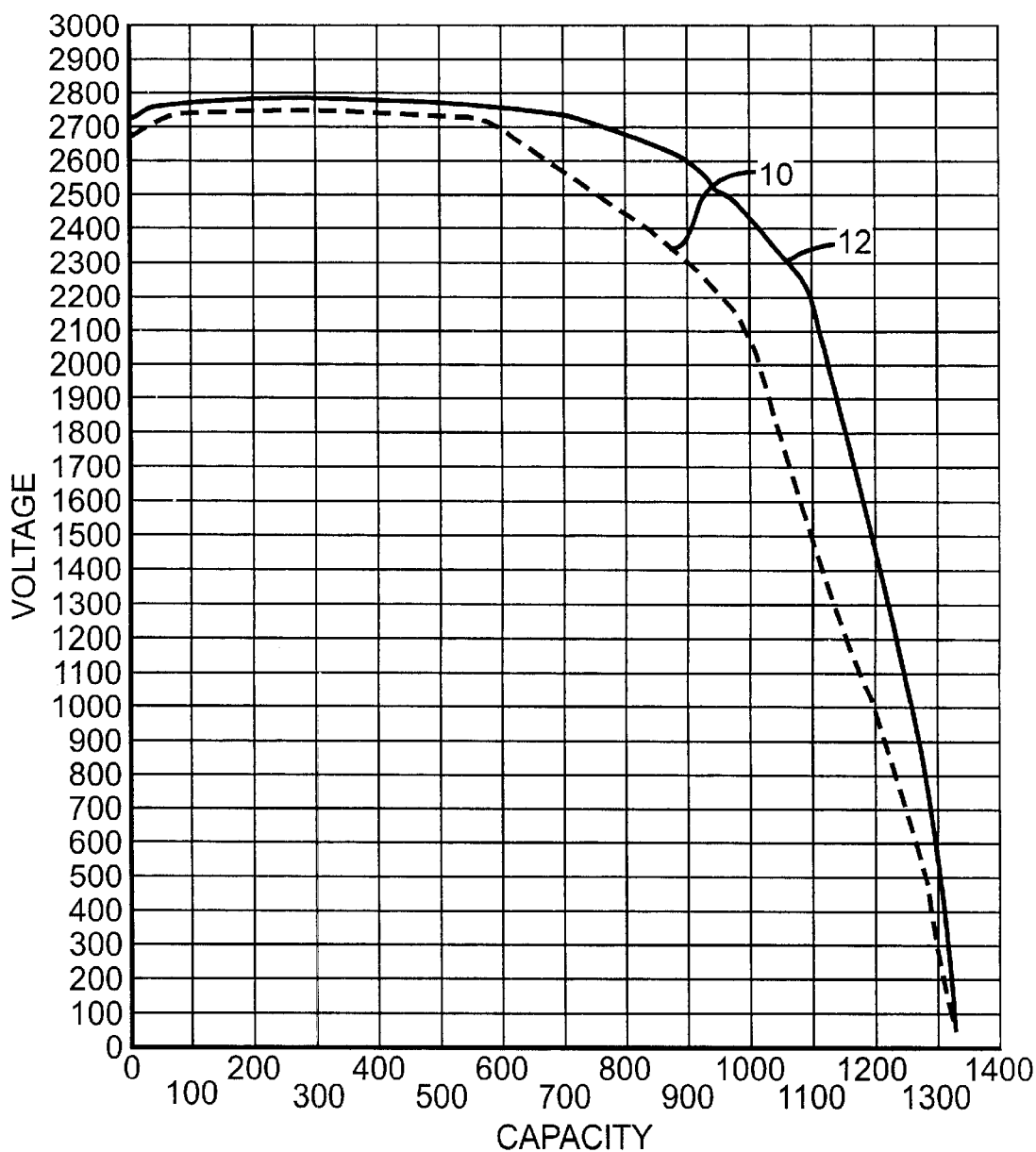
FIG. 1 is a graph constructed from the average discharge of a Li/CF$_x$ cells built according to the prior art.

The term discharge efficiency means the percentage of theoretical capacity which is delivered or utilized during discharge.

The electrochemical cell of the present invention comprises an anode of a metal selected from Groups IA, IIA and IIIB of the Periodic Table of the Elements, including lithium, sodium, potassium, etc., and their alloys and intermetallic compounds including, for example, Li—Si, Li—Al, Li—B and Li—Si—B alloys and intermetallic compounds. The preferred anode comprises lithium. An alternate anode comprises a lithium alloy such as a lithium-aluminum alloy. The greater the amount of aluminum present by weight in the alloy, however, the lower the energy density of the cell.

The form of the anode may vary, but preferably the anode is a thin metal sheet or foil of the anode metal, pressed or rolled on a metallic anode current collector, i.e., preferably comprising titanium, titanium alloy or nickel, to form an anode component. In the exemplary cell of the present invention, the anode component has an extended tab or lead of the same material as the anode current collector, i.e., preferably nickel or titanium, integrally formed therewith such as by welding and contacted by a weld to a cell case of conductive metal in a case-negative electrical configuration. Alternatively, the anode may be formed in some other geometry, such as a bobbin shape, cylinder or pellet to allow an alternate low surface cell design.

The electrochemical cell of the present invention further comprises a cathode of electronically conductive material which serves as the other electrode of the cell. The electrochemical reaction at the cathode involves conversion of ions which migrate from the anode to the cathode into atomic or molecular forms. The cathode of the present invention preferably comprises a solid active material such as fluorinated carbon represented by the formula $(CF_x)_n$ wherein x varies between about 0.1 to 1.9 and preferably between about 0.5 and 1.2 and $(C_2F)_n$ and wherein the n refers to the number of monomer units which can vary widely. These electrode active materials are composed of carbon and fluorine, and include graphitic and non-graphitic forms of carbon, such as coke, charcoal or activated carbon.

Before fabrication into an electrode for incorporation into an electrochemical cell, the fluorinated carbon active material is preferably mixed with a conductive additive. Suitable conductive additives include acetylene black, carbon black and/or graphite. Metals such as nickel, aluminum, titanium and stainless steel in powder form are also useful as conductive diluents when mixed with the above listed active materials. The electrode further comprises a binder material which is preferably a fluoro-resin powder such as powdered polytetrafluoroethylene (PTFE) or powdered polyvinylidene fluoride (PVDF). Additional active materials which are useful in an electrochemical cell according to the invention include silver vanadium oxide, copper-silver-vanadium oxide, manganese dioxide, lithium cobalt oxide, lithium nickel oxide, copper oxide, titanium disulfide, copper sulfide, iron sulfide, iron disulfide, copper vanadium oxide, and mixtures thereof. The preferred cathode active mixture comprises $CF_x$ combined with acetylene black and/or graphite; and PTFE.

Test results indicate that the same weight of fluorinated carbon active material pressed at higher pressures is more densely packed and occupies less volume than similar active material pressed at lower pressures according to conventional practice. In addition, the dimensions of the pressed pellet do not change significantly upon relaxation. Such characteristics yield unanticipated benefits when designing thin cells utilizing pressed pellet cathode electrodes. In that respect, additional electrochemically active material can be added to a casing of given dimensions, thereby increasing the cell's volumetric energy density. In the alternative, by increasing the cathode compaction significantly, the cell stack thickness is reduced, thereby decreasing the cell volume.

Accordingly, the volumetric energy density of the present lithium/fluorinated carbon couple is enhanced over that known in the prior art by, in part, decreasing the electrolyte-to-cathode (E/C) weight ratio. This is brought about by pressing the cathode mix comprising the cathode active material, conductive diluent and binder at a pressure of about 3,500 psi to about 7,500 psi, preferably about 5,510 psi. The cathode pellet of the Smesko et al. patent is formed at a pressure of about 3,080 psi.

Unexpectedly, $CF_x$ cathodes having increased packed density operate efficiently with electrolyte-to-cathode (E/C) weight ratios similar to those used in current state-of-the-art cells, such as in the previously discussed Smesko et al. patent. It has been determined that cathode pellets with higher pressed densities absorb less electrolyte. In addition, discharge testing has shown that the E/C ratio (based on the gram amount of the electrode active material) of 0.94 to 0.96 as described in the Smesko et al. patent, can be reduced to about 0.938 to about 0.73 and preferably about 0.81 (or 0.74 based on total cathode weight) at a formation pressure of about 5,510 psi. while yielding efficiently operating cells. The A/C weight ratio remains about 1.03, as in the Smesko et al. cell. Accordingly, it is an unanticipated result that sufficient porosity to allow for efficient uptake/absorption of electrolyte is maintained when higher pressing pressures are used to fabricate the cathode. It appears that the electrolyte not only wets the surface of the cathode active material, but is able to penetrate into the cathode, providing and maintaining continuity of ionic transport.

The cathode active mixture of the present invention is pressed onto a suitable current collector selected from the group consisting of stainless steel, titanium, tantalum, platinum and gold. The preferred current collector material is titanium, and most preferably the titanium cathode current collector has a thin layer of graphite/carbon paint applied thereto. Cathodes prepared as described above may be in the form of one or more plates operatively associated with at least one or more plates of anode material, or in the form of a strip wound with a corresponding strip of anode material in a structure similar to a "jellyroll".

In order to prevent internal short circuit conditions, the cathode is separated from the Group IA, IIA or IIIB anode material by a suitable separator material. The separator is of electrically insulative material, and the separator material also is chemically unreactive with the anode and cathode active materials and both chemically unreactive with and insoluble in the electrolyte. In addition, the separator material has a degree of porosity sufficient to allow flow therethrough of the electrolyte during the electrochemical reaction of the cell. Illustrative separator materials include fabrics woven from polypropylene and fluoropolymeric fibers including polyvinylidene fluoride, polyethylenetetrafluorethylene, and polyethylenechlorotrifluoroethylene used either alone or laminated with a fluoropolymeric microporous film, non-woven glass, polypropylene, polyethylene, glass fiber materials, ceramics, polytetrafluoroethylene membrane commercially available under the designation ZITEX (Chemplast Inc.), polypropylene membrane commercially available under the designation CELGARD (Celanese Plastic Company, Inc.) and a membrane commercially available under the designation DEXIGLAS (C. H. Dexter, Div., Dexter Corp.).

A preferred separator comprises a non-woven polypropylene fabric or cloth and a superimposed polypropylene film or membrane. Preferably, the non-woven fabric faces the cathode and the polypropylene microporous film faces the anode. That way, the non-woven layer acts as a wicking material to more effectively wet the cathode and serves as a barrier to puncture of the polypropylene film from loose carbon particles.

The electrochemical cell of the present invention further includes a nonaqueous, Ionically conductive electrolyte which serves as a medium for migration of ions between the anode and the cathode electrodes during the electrochemical reactions of the cell. The electrochemical reaction at the electrodes involves conversion of ions in atomic or molecular forms which migrate from the anode to the cathode. Thus, nonaqueous electrolytes suitable for the present invention are substantially inert to the anode and cathode materials, and they exhibit those physical properties necessary for ionic transport, namely, low viscosity, low surface tension and wettability.

A suitable electrolyte has an inorganic, ionically conductive salt dissolved in a nonaqueous solvent, and more preferably, the electrolyte includes an ionizable alkali metal salt dissolved in a mixture of aprotic organic solvents comprising a low viscosity solvent and a high permittivity solvent. The inorganic, ionically conductive salt serves as the vehicle for migration of the anode ions to intercalate or react with the cathode active material. Preferably, the ion-forming alkali metal salt is similar to the alkali metal comprising the anode. Suitable salts include $LiPF_6$, $LiBF_4$, $LiAsF_6$, $LiSbF_6$, $LiClO_4$, $LiAlCl_4$, $LiGaCl_4$, $LiC(SO_2CF_3)_3$, $LiO_2$, $LiN(SO_2CF_3)_2$, $LiSCN$, $LiO_3SCF_2CF_3$, $LiC_6F_5SO_3$, $LiO_2CCF_3$, $LiSO_3F$, $LiB(C_6H_5)_4$, $LiCF_3SO_3$, and mixtures thereof. Suitable salt concentrations typically range between about 0.8 to 1.5 molar.

Low viscosity solvents useful with the present invention include esters, linear and cyclic ethers and dialkyl carbonates such as tetrahyrofuran (THF), methyl acetate (MA), diglyme, triglyme, tetraglyme, dimethyl carbonate (DMC), 1,2-dimethoxyethane (DME), 1,2-diethoxyethane (DEE), diethyl carbonate, and mixtures thereof, and high permittivity solvents include cyclic carbonates, cyclic esters and cyclic amides such as propylene carbonate (PC), ethylene carbonate (EC), acetonitrile, dimethyl sulfoxide, dimethyl formamide, dimethyl acetamide, γ-valerolactone, γ-butyrolactone (GBL), N-methyl-pyrrolidinone (NMP), and mixtures thereof. In the present invention, the preferred anode is lithium metal and the preferred electrolyte is 1.0 M to 1.4 M $LiBF_4$ in γ-butyrolactone (GBL).

When the A/C capacity ratio is the same as in the prior art Smesko et al. $Li/CF_x$ cell, i.e., about 1.03, the increased pressing pressure of the cathode active mixture results in a lower E/C ratio of as low as about 0.73 and, unexpectedly, an improved theoretical capacity and rated capacity.

The preferred form of the electrochemical cell is a case-negative design wherein the anode/cathode couple is inserted into a conductive metal casing such that the casing is connected to the anode current collector, as is described in the previously referenced Muffoletto et al. patent. The casing has preferred nominal dimensions of 45 mm×23 mm×5 mm. A preferred material for the casing is titanium although stainless steel, mild steel, nickel, nickel-plated mild steel and aluminum are also suitable. The casing header comprises a metallic lid having a sufficient number of openings to accommodate the glass-to-metal seal/terminal pin feedthrough for the cathode electrode. The anode electrode is preferably connected to the case or the lid. An additional opening is provided for electrolyte filling. The casing header comprises elements having compatibility with the other components of the electrochemical cell and is resistant to corrosion. The cell is thereafter filled with the electrolyte solution described hereinabove and hermetically sealed such as by close-welding a stainless steel plug over the fill hole, but not limited thereto. The cell of the present invention can also be constructed in a case-positive design.

The following examples describe the manner and process of manufacturing an electrochemical cell according to the present invention, and they set forth the best mode contemplated by the inventors of carrying out the invention, but they are not to be construed as limiting.

EXAMPLE I

Ten prior art case-negative cells according to U.S. Pat. No. 5,716,728 to Smesko et al. were constructed. For each cell, the casing was of stainless steel having nominal dimensions of 45 mm×23 mm±5 mm. For each cell, the cathode weighed 1.68±0.01 grams and comprised, by total weight percent, 91% $CF_x$, 5% carbon black and 4% PTFE. The cathode was fabricated by pressing the active material at a pressure of. 3,080 psi to an etched titanium screen, which in turn was spot welded to the Ti pin of a titanium header via a titanium couple. For each cell, the anode comprised 0.353±0.006 grams of lithium pressed to the wing-like, etched titanium screen sections of an anode current collector, which was then spot welded to the stainless steel header.

One layer of a non-woven polypropylene fabric (Dynaweb WD902x, Web Dynamics) superimposed with one layer of a polypropylene microporous film (Celgard 3500), Hoeschst Celanese) was heat-sealed around the cathode in each cell. The separator structure was positioned with the non-woven fabric in contact with the cathode and the microporous film in contact with the anode halves. The cell stack assembly was then welded onto the titanium case and about 1.45 grams of 1.0 M $LiBF_4$ in γ-butyrolactone electrolyte was added to each cell via the fill hole in the header. The fill hole was sealed with a lower stainless steel ball and an upper titanium plug. The cells were hermetically sealed by close welding the upper plug into the header. The prior art cells had an E/C weight ratio of about 0.948 and an A/C capacity ratio of about 1.03 (based on the gram amount of cathode active material).

FIG. 1 presents the average discharge profile of five of the case negative 5 mm $Li/CF_x$ cells according to the Smesko et al. patent discharged under a 1 kohm load and five cells discharged under a 2 kohm load. In particular, curve 10 was constructed from the average 1 kohm discharge profile of the Smesko et al. cells and curve 12 was constructed from the 2 kohm discharge results. From these voltage profiles, it can be seen that under a 1 kohm load, the prior art $Li/CF_x$ cells deliver between about 786 mAh to about 918 mAh to a 2.4 V cutoff. Under a 2 kohm load, the cells exhibit a somewhat tighter distribution of delivered capacity to a 2.4 V cutoff, as the values range from about 967 to about 1050 mAh.

EXAMPLE II

Ten Li/CF$_x$ cells according to the present invention were built having an identical chemistry as described in Example I, except that the cathode pellets were pressed at 5510 psi. The same cathode weight and E/C ratio of 0.948 used in the control cells was also used in these test units. Again, five of the cells were discharged under a 1 kohm load and five were discharged under a 2 kohm load. In particular, curve 20 was constructed from the average 1 kohm discharge profile of the present invention cells and curve 22 was constructed from the average 2 kohm discharge of the cells.

Figure 2:
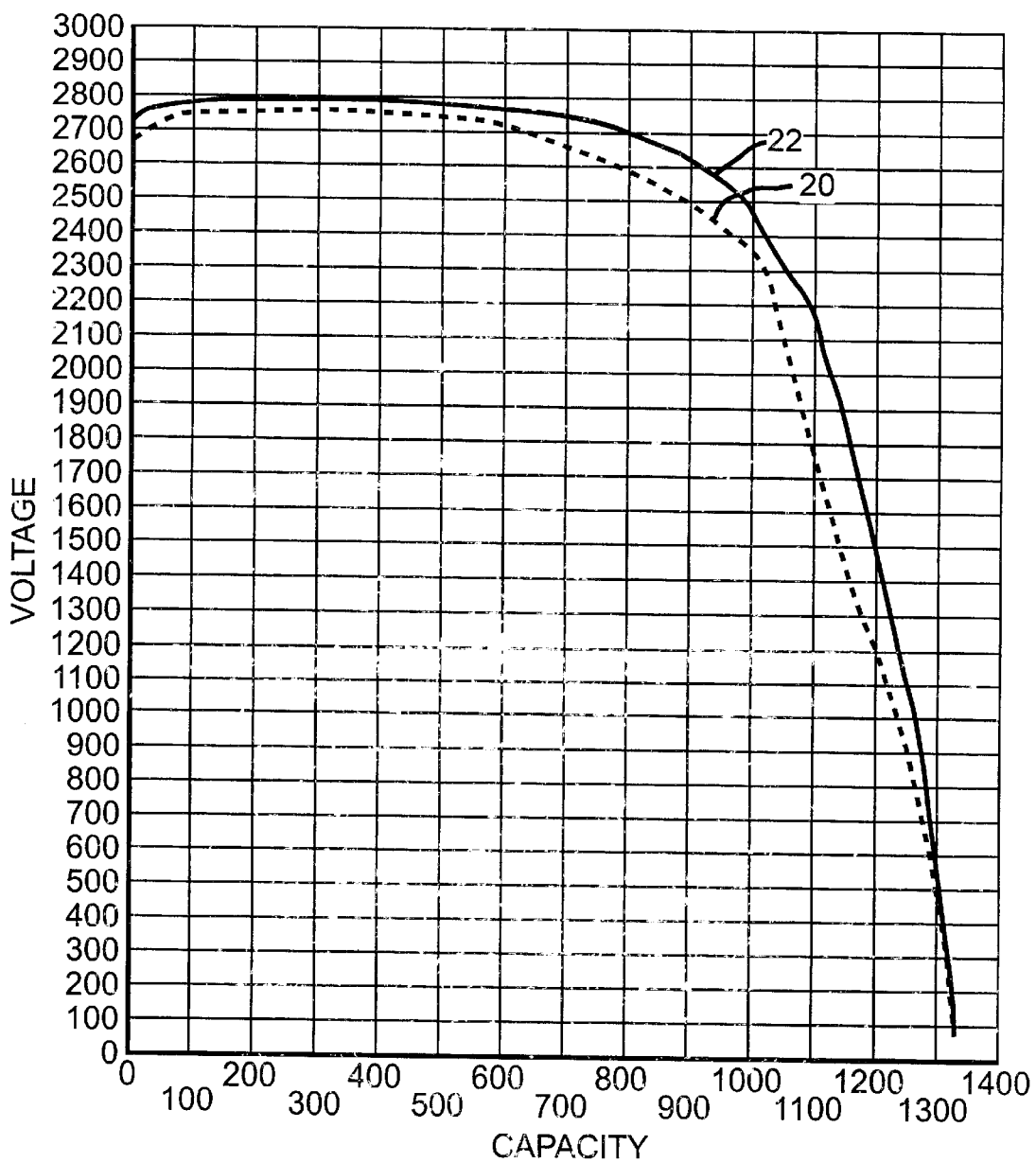
FIG. 2 is a graph constructed from the average discharge of a Li/CF$_x$ cells built according to the present invention.

The discharge profiles of the test cells shown in FIG. 2 indicate a higher degree of reproducibility, as evidenced by the smaller amount of spread in the data obtained under the 1 and 2 kohm discharge loads. This is in contrast to the larger degree of variability noted among the profiles of the control cells in FIG. 1. Under the 1 kohm loads, the present invention cells utilizing 1.68 g cathodes pressed at 5510 psi delivered 979 mAh to a 2.4 V cutoff. The cells delivered between 1025 and 1050 mAh to a 2.4 V cutoff when discharged under 2 kohm loads. In addition, the discharge profiles indicate that under each discharge load, the cells utilizing the higher press density cathodes also delivered additional capacity to voltages above 2.4 V.

Tables 1 and 2 contain a summary of the average capacities delivered by the state-of-the-art cells and those with the higher press density cathodes according to the present invention, along with the average additional capacities provided to various voltage cutoffs by the cells with the higher press density cathodes under a 1 kohm load cutoff and a 2 kohm load cutoff, respectively.

TABLE 1

| Under 1 Kohm Load Cutoff, V | 3080 psi Average mAh delivered | 5510 psi Average mAh delivered | Average Additional capacity, mAh |
|---|---|---|---|
| 2.7 | 598 | 636 | 38 |
| 2.6 | 700 | 786 | 86 |
| 2.5 | 782 | 900 | 118 |
| 2.4 | 852 | 979 | 127 |

TABLE 2

| Under 2 Kohm Load Cutoff, V | 3080 psi Average mAh delivered | 5510 psi Average mAh delivered | Average Additional capacity, mAh |
|---|---|---|---|
| 2.7 | 767 | 808 | 41 |
| 2.6 | 891 | 924 | 33 |
| 2.5 | 967 | 993 | 26 |
| 2.4 | 1009 | 1050 | 41 |

Figure 3:
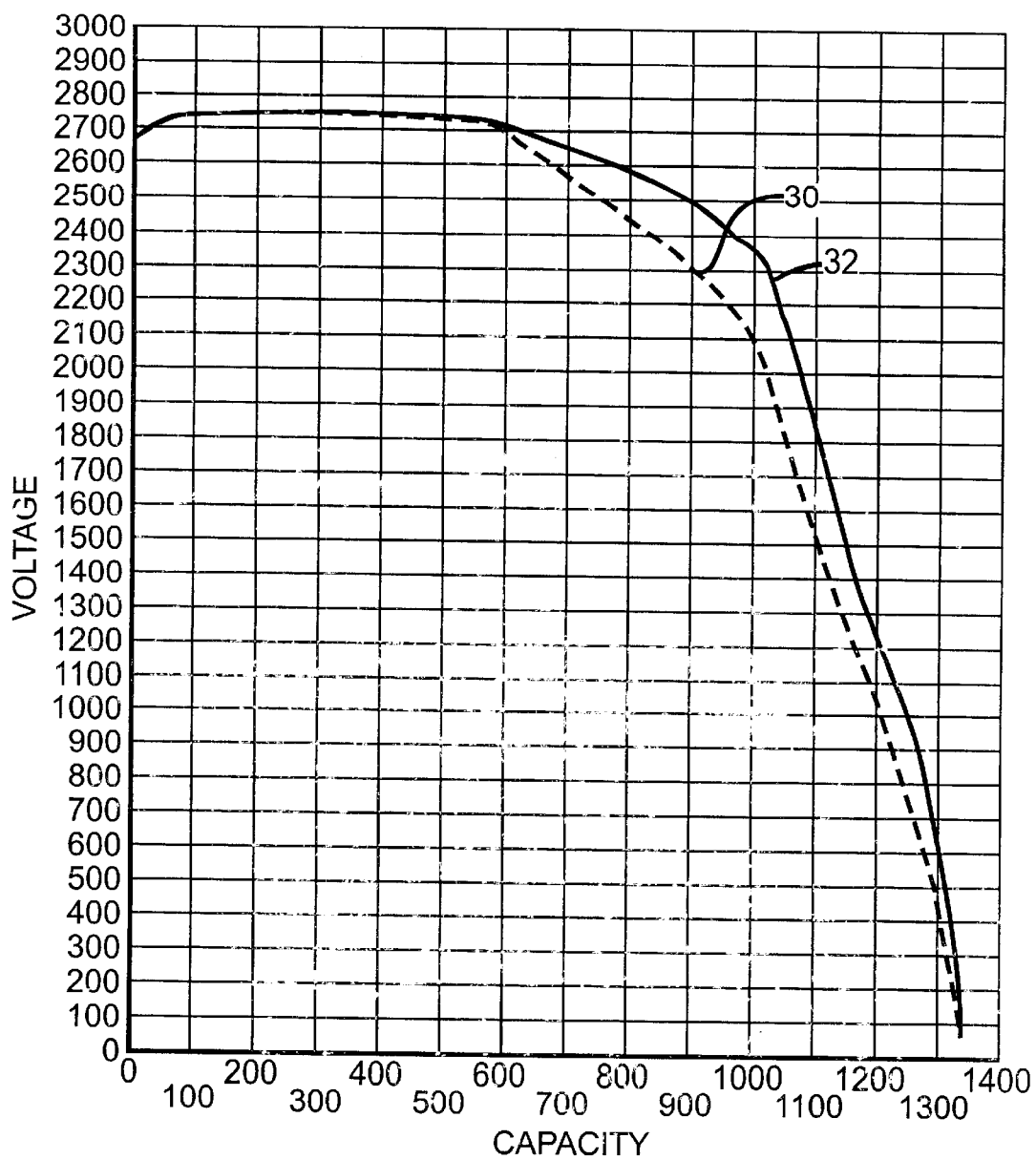
FIGS. 3 and 4 are graphs constructed from a comparison of the average discharge of the prior art cells against that of the present invention cells under a 1 kohm load and a 2 kohm load, respectively.
Figure 4:
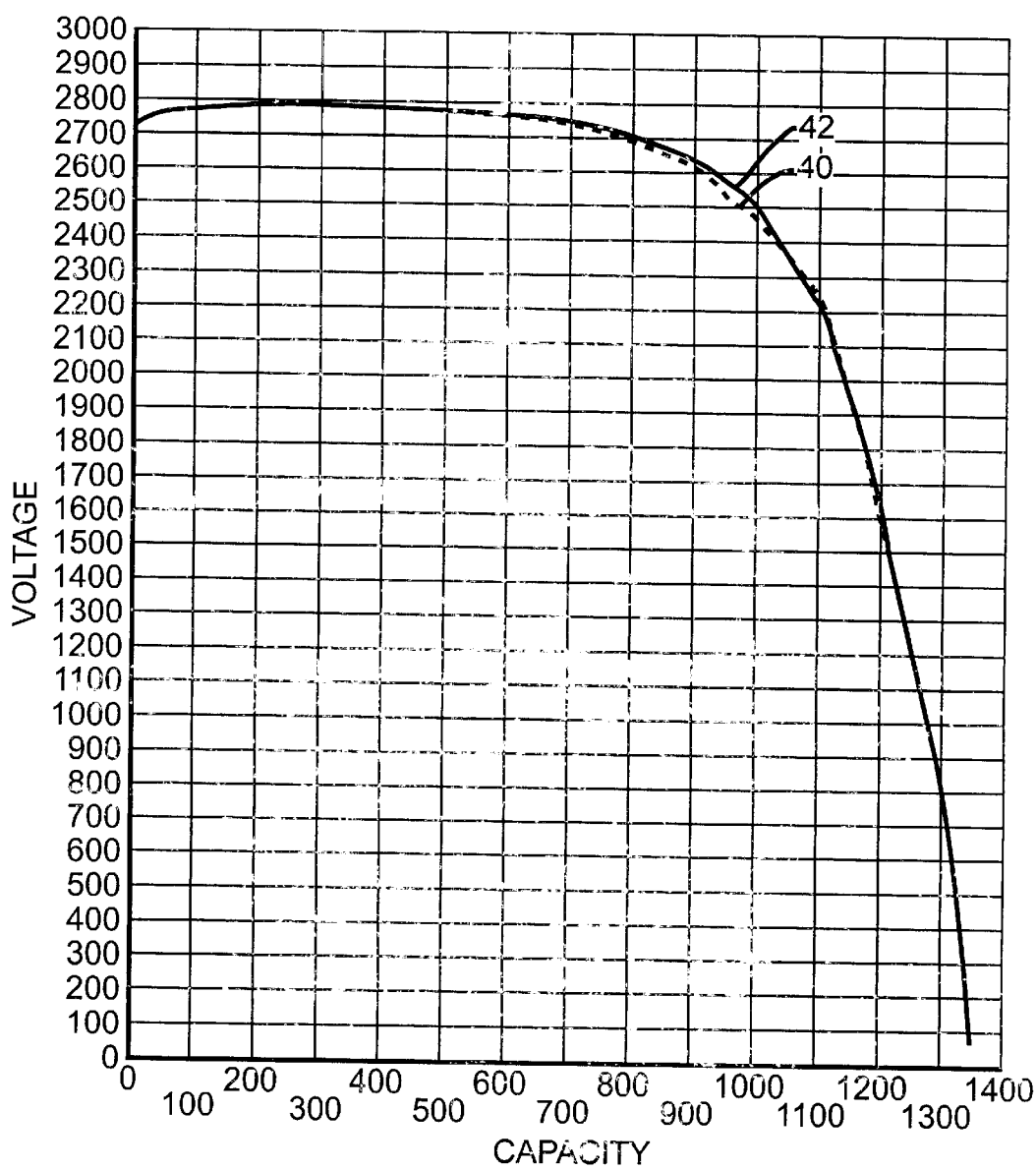

FIGS. 3 and 4 are different representations of the data shown in FIGS. 1 and 2. FIG. 3 compares the average 1 kohm discharge results between the prior art cells built with 1.68 g cathodes pressed at 3080 psi (curve 30) and those according to the present invention pressed at 5510 psi (curve 32). FIG. 4 compares average 2 kohm discharge results between the prior art cells with 1.68 g cathodes pressed at 3080 psi (curve 40) against the present invention cells with 1.68 g cathodes pressed at 5510 psi (curve 42).

This data illustrates that using 1.68 g cathodes pressed at 5510 psi increases the volumetric energy density of the cell, especially to voltages above a 2.4 V cutoff. Consequently, increased delivered capacity and increased discharge efficiency are realized by increasing the cathode formation pressure while maintaining the current cathode dimensions. In other words, the gram amount of cathode active material is increased for a similarly sized 5 mm casing. A cell with greater cathode weight (having a proportionate increase in electrode active oxidant weight) pressed at 5510 psi has greater stoichiometric capacity than a cell of an identical chemistry with a less dense cathode pressed at 3080 psi.

It is appreciated that various modifications to the inventive concepts described herein may be apparent to those skilled in the art without departing from the spirit and the scope of the present invention defined by the hereinafter appended claims.

What is claimed is:

1. An electrochemical cell, which comprises:
   a) an anode comprising an anode active material;
   b) a cathode operatively associated with the anode, wherein the cathode comprises a cathode active material; and
   c) an electrolyte solution activating the anode and the cathode, wherein the anode active material and the cathode active material are present in the cell in an anode-to-cathode capacity ratio of about 1.03 and wherein the electrolyte and the cathode active material are present in the cell in an electrolyte-to-cathode weight ratio of about 0.938 to about 0.73 (based on a gram amount of cathode active material).

2. The electrochemical cell of claim 1 wherein the cathode active material comprises fluorinated carbon.

3. The electrochemical cell of claim 2 wherein the cathode active material is characterized as having been formed at a pressure of about 5,510 psi to provide an electrolyte-to-cathode weight ratio of about 0.81, based on the gram amount of cathode active material.

4. The electrochemical cell of claim 2 wherein the fluorinated carbon is present in a cathode active mixture in a range of about 80% to about 95%, by weight, remainder being at least one of a binder material and a conductive additive.

5. The electrochemical cell if claim 4 wherein the cathode active mixture is characterized as having been formed at a pressure of about 3,500 psi to about 7,500 psi.

6. The electrochemical cell of claim 4 wherein the binder material is a fluoro-resin powder.

7. The electrochemical cell of claim 4 wherein the conductive additive is selected from the group consisting of carbon, graphite powder, acetylene black, titanium powder, aluminum powder, nickel powder, stainless steel powder, and mixtures thereof.

8. The electrochemical cell of claim 1 wherein the cathode further includes a current collector selected from the group consisting of titanium, stainless steel, tantalum, platinum and gold.

9. The electrochemical cell of claim 8 wherein the cathode current collector is provided with a layer of carbonaceous paint.

10. The electrochemical cell of claim 1 wherein the anode comprises an alkali metal.

11. The electrochemical cell of claim 10 wherein the alkali metal is lithium.

12. The electrochemical cell of claim 1 wherein the anode further includes a current collector selected from the group consisting of titanium, nickel, copper, tungsten and tantalum.

13. The electrochemical cell of claim 1 wherein the anode contacts the casing in a case-negative configuration.

14. The electrochemical cell of claim 1 wherein the electrolyte solution operatively associated with the anode and the cathode comprises an ion-forming alkali metal salt dissolved in a nonaqueous solvent, wherein the alkali metal of the salt is similar to the alkali metal comprising the anode.

15. The electrochemical cell of claim 14 wherein the alkali metal of the anode comprises lithium and the ion-forming alkali metal salt comprising the electrolyte solution is selected form the group consisting of $LiPF_6$, $LiBF_4$, $LiAsF_6$, $LiSbF_6$, $LiClO_4$, $LiAlCl_4$, $LiGaCl_4$, $LiC(SO_2CF_3)_3$, $LiO_2$, $LiN(SO_2CF_3)_2$, $LiSCN$, $LiO_3SCF_2CF_3$, $LiC_6F_5SO_3$, $LiO_2CCF_3$, $LiSO_3F$, $LiB(C_6H_5)_4$, $LiCF_3SO3$, and mixtures thereof.

16. The electrochemical cell of claim 15 wherein the nonaqueous solvent comprises at least one organic solvent selected from the group consisting of tetrahydrofuran, methyl acetate, diglyme, triglyme, tetraglyme, dimethyl carbonate, 1,2-dimethoxyethane, 1,2-diethoxyethane, diethyl carbonate, acetonitrile, dimethyl sulfoxide, dimethyl formamide, dimethyl acetamide, propylene carbonate, ethylene carbonate, γ-valerolactone, γ-butyrolactone, N-methyl-pyrrolidinone, and mixtures thereof.

17. The electrochemical cell of claim 1 wherein a separator is provided between the anode and the cathode to prevent internal short circuit contact between them, and wherein the separator comprises a superimposed non-woven fabric and a microporous film.

18. The electrochemical cell of claim 17 wherein the separator comprises a superimposed non-woven polypropylene fabric and a polypropylene microporous film.

19. The electrochemical cell of claim 18 wherein the non-woven polypropylene fabric faces the cathode and the polypropylene microporous film faces the anode.

20. The electrochemical cell of claim 1 housed in a conductive casing comprising a material selected from the group consisting of titanium, stainless steel, mild steel, nickel, nickel-plated mild steel and aluminum.

21. The electrochemical cell of claim 1 wherein the anode comprises lithium anode active material in electrical contact with a nickel current collector and the cathode comprises fluorinated cathode active material in electrical contact with a titanium current collector and wherein the anode and the cathode are activated with the electrolyte solution comprising 1.0 M $LiBF_4$ in γ-butyrolactone and housed in a conductive casing comprising titanium.

22. An electrochemical cell, which comprises:
 a) an anode comprising lithium;
 b) a cathode operatively associated with the anode, wherein the cathode comprises fluorinated carbon as a cathode active material; and
 c) an electrolyte solution activating the anode and the cathode, the electrolyte solution comprising an ion-forming lithium salt dissolved in a nonaqueous solvent, wherein the lithium and the fluorinated carbon are present in the cell in an anode-to-cathode capacity ration of about 1.03 and wherein the electrolyte solution and the fluorinated carbon are present in the cell in an electrolyte-to-cathode weight ratio of about 0.938 to about 0.73 (based on a gram amount of cathode active material).

23. The electrochemical cell of claim 22 wherein the cathode active material is characterized as having been formed at a pressure of about 5,510 psi to provide an electrolyte-to-cathode weight ratio of about 0.81, based on the gram amount of cathode active material.

24. The electrochemical cell of claim 22 wherein the fluorinated carbon is present in a cathode active mixture in a range of about 80% to about 95%, by weight, remainder being at least one of a binder material and a conductive additive.

25. The electrochemical cell of claim 24 wherein the cathode active mixture is characterized as having been formed at a pressure of about 3,500 psi to about 7,500 psi.

26. The electrochemical cell of claim 22 wherein the cathode further includes a current collector comprising titanium and the anode further includes a current collector comprising nickel.

27. The electrochemical cell of claim 26 wherein the cathode current collector is provided with a layer of carbonaceous paint.

28. The electrochemical cell of claim 22 wherein the ion-forming lithium salt comprising the electrolyte solution is selected from the group consisting of $LiPF_6$, $LiBF_4$, $LiAsF_6$, $LiSbF_6$, $LiClO_4$, $LiAlCl_4$, $LiGaCl_4$, $LiC(SO_2CF_3)_3$, $LiO_2$, $LiN(SO_2CF_3)_2$, $LiSCN$, $LiO_3SCF_2CF_3$, $LiC_6F_5SO_3$, $LiO_2CCF_3$, $LiSO_3F$, $LiB(C_6H_5)_4$, $LiCF_3SO_3$, and mixtures thereof.

29. The electrochemical cell of claim 22 wherein the nonaqueous solvent comprises at least one organic solvent selected form the group consisting of tetrahydrofuran, methyl acetate, diglyme, triglyme, tetraglyme, dimethyl carbonate, 1,2-dimethoxyethane, 1,2-diethoxyethane, diethyl carbonate, aetronitrile, dimethyl sulfoxide, dimethyl formamide, dimethyl acetamide, propylene carbonate, ethylene carbonate, γ-valerolactone, γ-butyrolactone, N-methyl-pyrrolidinone, and mixtures thereof.

30. The electrochemical cell of claim 22 wherein a separator is provided between the anode and the cathode to prevent internal short circuit contact between them, and wherein the separator comprises a superimposed non-woven fabric and a microporous film.

31. The electrochemical cell of claim 30 wherein the separator laminate comprises a superimposed non-woven polypropylene fabric and a polypropylene microporous film.

32. The electrochemical cell of claim 31 wherein the non-woven polypropylene fabric faces the cathode and the polypropylene microporous film faces the anode.

33. The electrochemical cell of claim 22 housed in a conductive casing comprising a material selected from the group consisting of titanium stainless steel, mild steel, nickel, nickel-plated mild steel and aluminum.

34. The electrochemical cell of claim 21 wherein the lithium is in electrical contact with a nickel current collector and the fluorinated carbon is in electrical contact with a titanium current collector and wherein the anode and the cathode are activated with the electrolyte solution comprising 1.0 M $LiBF_4$ in γ-butyrolactone and housed in a conductive casing comprising titanium.

35. A method of providing an electrochemical cell, comprising the steps of:
 a) providing a casing;
 b) providing an anode comprising an anode active material;
 c) providing a cathode comprised of a cathode active material;
 d) operatively associating the anode with the cathode housed inside the casing with the anode active material and the cathode active material in an anode-to-cathode capacity ratio of about 1.03 and wherein the anode and the cathode are connected to respective terminals; and
 e) activating the anode and the cathode with an electrolyte filled in to the casing, wherein the electrolyte and the cathode active material are present in the cell in an electrolyte-to-cathode weight ratio of about 0.938 to 0.73 (based on a gram amount of cathode active material).

36. The method of claim 35 including providing the cathode active material comprised of fluorinated carbon.

37. The method of claim 36 including pressing the cathode active material at a pressure of about 5,510 psi to provide an electrolyte-to-cathode weight ratio of about 0.81, based on the gram amount of cathode active material.

38. The method of claim 35 including providing the fluorinated carbon present in the cathode in-about 80% to about 95%, by weight, remainder being at least one of a binder material and a conductive additive.

39. The method of claim 38 including forming the cathode by pressing the cathode active mixture at a pressure of about 3,500 psi to about 7,500 psi.

40. The method of claim 35 including providing the cathode having a current collector selected from the group consisting of titanium, stainless steel, tantalum, platinum and gold.

41. A The method of claim 40 including providing the cathode current collector with a layer of carbonaceous paint.

42. The method of claim 35 including providing the anode comprised of an alkali metal.

43. The method of claim 35 including providing the anode having a current collector selected from the group consisting of titanium, nickel, copper, tungsten and tantalum.

44. The method of claim 35 including providing the cathode current collector comprised of titanium.

45. The method of claim 36 including providing the electrolyte solution having an ion-forming alkali metal salt dissolved in a nonaqueous solvent, the alkali metal salt selected from the group consisting of $LiPF_6$, $LiBF_4$, $LiAsF_6$, $LiSbF_6$, $LiClO_4$, $LiAlCl_4$, $LiGaCl_4$, $LiC(SO_2CF_3)_3$, $LiO_2$, $LiN(SO_2CF_3)_2$, $LiSCN$, $LiO_3SCF_2CF_3$, $LiC_6F_5SO_3$, $LiO_2CCF_3$, $LiSO_3F$, $LiB(C_6H_5)_4$, $LiCF_3SO_3$, and mixtures thereof.

46. The method of claim 45 including providing the nonaqueous solvent comprising at least one organic solvent selected form the group consisting of tetrahydrofuran, methyl acetate, diglyme, triglyme, tetraglyme, dimethyl carbonate, 1,2-dimethoxyethane, 1,2-diethoxyethane, diethyl carbonate, acetonitrile, dimethyl sulfoxide, dimethyl formamide, dimethyl acetamide, propylene carbonate, ethylene carbonate, γ-valerolactone, γ-butyrolactone, N-methyl-pyrrolidinone, and mixtures thereof.

47. The method of claim 35 including providing a separator between the anode and the cathode to prevent internal short circuit conditions and further including providing the separator comprising a superimposed non-woven fabric and a microporous film.

48. The method of claim 47 including providing the separator comprising a superimposed non-woven polypropylene film facing the cathode and a polypropylene microporous film facing the anode.

49. The method of claim 35 including providing the casing comprising a conductive material selected from the group consisting of titanium, stainless steel, mild steel, nickel, nickel-plated mild steel and aluminum.

50. The method of claim 35 including providing lithium as the anode active material contacting a nickel current collector and fluorinated carbon as the cathode active material contacting a titanium current collector and activating the anode and the cathode with the electrolyte comprising 1.0 M $LiBF_4$ in γ-butyrolactone and further including housing the cell in a conductive casing comprising titanium.

51. A method of providing an electrochemical cell, comprising the steps of:
   a) providing a casing;
   b) providing an anode comprising an anode active material;
   c) providing a cathode comprised of a cathode active material pressed to a conductor cathode current collector at a pressure of about 3,500 psi. to about 7,500 psi.;
   d) operatively associating the anode with the cathode housed inside the casing with the anode and the cathode connected to respective terminals; and
   e) activating the anode and the cathode with an electrolyte provided in the casing.

* * * * *